(12) United States Patent
Minamikawa et al.

(10) Patent No.: US 9,776,620 B2
(45) Date of Patent: Oct. 3, 2017

(54) CONTROL SYSTEM FOR HYBRID VEHICLE

(71) Applicant: TOYOTA JIDOSHA KABUSHIKI KAISHA, Toyota-shi, Aichi-ken (JP)

(72) Inventors: Koki Minamikawa, Nagoya (JP); Toshio Sugimura, Nagoya (JP); Seiji Kuwahara, Toyota (JP); Takahiko Tsutsumi, Nisshin (JP); Masato Yoshikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 85 days.

(21) Appl. No.: 14/900,075

(22) PCT Filed: Jun. 18, 2014

(86) PCT No.: PCT/IB2014/001102
§ 371 (c)(1),
(2) Date: Dec. 18, 2015

(87) PCT Pub. No.: WO2014/207527
PCT Pub. Date: Dec. 31, 2014

(65) Prior Publication Data
US 2016/0144849 A1    May 26, 2016

(30) Foreign Application Priority Data

Jun. 27, 2013    (JP) .................................. 2013-135487

(51) Int. Cl.
*B60L 11/14*    (2006.01)
*B60L 11/18*    (2006.01)
(Continued)

(52) U.S. Cl.
CPC .............. *B60W 20/13* (2016.01); *B60L 11/14* (2013.01); *B60L 11/1861* (2013.01);
(Continued)

(58) Field of Classification Search
None
See application file for complete search history.

(56) References Cited

U.S. PATENT DOCUMENTS 4,042,056 A * 8/1977 Horwinski ............. B60K 6/387
180/65.25
6,637,530 B1 * 10/2003 Endo ...................... B60K 6/365
180/65.25
(Continued)

FOREIGN PATENT DOCUMENTS

EP    2130732 A1    12/2009
JP    S61-205510 A    9/1986
(Continued)

*Primary Examiner* — Russell Frejd
(74) *Attorney, Agent, or Firm* — Oliff PLC

(57) ABSTRACT

An upper limit charging rate is limited when a speed position of an automatic transmission is high as compared to when the speed position is low, so an engine is hard to enter a high torque state even when the speed position is high. Thus, it is possible to suppress vibrations and noise that tend to occur at the time when the engine is driven at a low rotation speed and high torque. On the other hand, the upper limit charging rate increases when the speed position is low as compared to when the speed position is high, with the result that a charging rate increases, so it is possible to keep a state of charge of a battery within an appropriate range.

9 Claims, 9 Drawing Sheets

(51) Int. Cl.
*B60L 15/20* (2006.01)
*B60W 20/13* (2016.01)
*B60W 10/02* (2006.01)
*B60W 10/06* (2006.01)
*B60W 10/26* (2006.01)

(52) U.S. Cl.
CPC ......... *B60L 15/2054* (2013.01); *B60W 10/02* (2013.01); *B60W 10/06* (2013.01); *B60W 10/26* (2013.01); *B60L 2210/40* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2240/486* (2013.01); *B60L 2240/507* (2013.01); *B60L 2250/24* (2013.01); *B60L 2270/142* (2013.01); *B60L 2270/145* (2013.01); *B60W 2510/244* (2013.01); *B60W 2710/021* (2013.01); *B60W 2710/06* (2013.01); *Y02T 10/645* (2013.01); *Y02T 10/70* (2013.01); *Y02T 10/705* (2013.01); *Y02T 10/7005* (2013.01); *Y02T 10/7044* (2013.01); *Y02T 10/7077* (2013.01); *Y02T 10/7241* (2013.01); *Y02T 10/7275* (2013.01); *Y10S 903/93* (2013.01)

(56) References Cited

U.S. PATENT DOCUMENTS

| | | | |
|---|---|---|---|
| 7,575,078 B2 * | 8/2009 | Muta | B60W 20/30 180/65.21 |
| 2008/0029320 A1 | 2/2008 | Fleckner et al. | |
| 2008/0236921 A1 * | 10/2008 | Huseman | B60K 6/445 180/165 |
| 2009/0029825 A1 * | 1/2009 | Matsubara | B60W 20/13 477/35 |

FOREIGN PATENT DOCUMENTS

| | | |
|---|---|---|
| JP | 2009-248913 A | 10/2009 |
| JP | 2010-042708 A | 2/2010 |
| JP | 2012-091716 A | 5/2012 |
| JP | 2013-071662 A | 4/2013 |

\* cited by examiner

CONTROL SYSTEM FOR HYBRID VEHICLE

BACKGROUND OF THE INVENTION

1. Field of the Invention

The invention relates to a control system for a hybrid vehicle and, more particularly, to control for charging a battery.

2. Description of Related Art

There is generally known a hybrid vehicle including an engine and an electric motor that are coupled to drive wheels such that power is transmitted. The hybrid vehicle travels while switching into a plurality of traveling modes on the basis of a traveling state of the vehicle. For example, when the state of charge (level of charge) of a battery becomes lower than or equal to a predetermined value and a request for charging the battery is output, the traveling mode is switched into a mode in which the vehicle travels by using part of the power of the engine while electric power is generated by the electric motor by using the remaining part of the power of the engine. A hybrid vehicle described in Japanese Patent Application Publication No. 2009-248913 (JP 2009-248913 A) is also one of such vehicles. JP 2009-248913 A describes a technique for, in the hybrid vehicle that charges a battery by using the power of an engine within the range of a limit charging value in response to a charging request for charging the battery, decreasing the limit charging value when a vehicle speed is low. In this way, by decreasing the limit charging value when the vehicle speed is low, occurrence of vibrations and noise during traveling is suppressed by preventing the engine from being driven at a low rotation speed and high torque.

SUMMARY OF THE INVENTION

The hybrid vehicle described in JP 2009-248913 A does not include a transmission between both the engine and an electric motor and drive wheels. In a hybrid vehicle in which a transmission is provided in a power transmission path between both an engine and an electric motor and drive wheels, the rotation speed of the engine also varies with the speed position of the transmission; however, when the hybrid vehicle is controlled as in the case of the hybrid vehicle described in JP 2009-248913 A, the engine may be operated at a low rotation speed and high torque depending on the speed position, with the result that vibrations and noise may occur. Of course, it is allowed to uniformly tighten the limit charging value irrespective of the speed position for the purpose of suppressing occurrence of vibrations and noise; however, a charging rate decreases accordingly, so the state of charge of the battery may not be appropriately kept.

The invention provides a control system that, in a hybrid vehicle in which an engine and an electric motor are coupled to a drive wheel such that power is transmitted and a transmission is provided in a power transmission path between the drive wheel and both the engine and the electric motor, is able to appropriately keep the state of charge of a battery while suppressing vibrations and noise that occur at the time when the vehicle travels with power generation being carried out by the electric motor.

A first aspect of the invention relates to a control system for a hybrid vehicle. The control system includes a drive wheel, an engine, an electric motor, a transmission, a battery and a controller. The engine is coupled to the drive wheel such that power is transmitted to the drive wheel. The electric motor is coupled to the drive wheel such that power is transmitted to the drive wheel. The transmission is provided in a power transmission path between the drive wheel and both the engine and the electric motor. The battery is configured to be charged with electric power generated by the electric motor. The controller is configured to cause the hybrid vehicle to travel by using power of the engine while keeping a charging rate for charging the battery at or below a limit charging value in response to a charging request for charging the battery. The controller is configured to set the limit charging value such that the limit charging value is lower when a speed position of the transmission is high than when the speed position is low.

With this configuration, the charging rate is limited when the speed position is high as compared to when the speed position is low, so the engine is hard to enter a high torque state even when the speed position is high, that is, the rotation speed of the engine is low. Thus, it is possible to suppress vibrations and noise that tend to occur at the time when the engine is driven at a low rotation speed and high torque. On the other hand, the limit charging value is higher when the speed position is low than when the speed position is high, so the charging rate also increases, and it is possible to keep the state of charge of the battery within an appropriate range. In this way, vibrations and noise are suppressed by decreasing the limit charging value when the speed position is high, that is, vibrations and noise tend to occur, and the appropriate charging rate is set when the speed position is low. Thus, it is possible to achieve both suppressing occurrence of vibrations and noise and keeping the state of charge of the battery.

In the control system, the controller may be configured to set the limit charging value such that the limit charging value is lower when a vehicle speed is low than when the vehicle speed is high. With this configuration, the rotation speed of the engine decreases as the vehicle speed decreases, and the limit charging value decreases accordingly, so an increase in the torque of the engine is suppressed, and occurrence of vibrations and noise during traveling is suppressed.

In the control system, the controller may be configured to calculate a basic required charging rate for keeping the state of charge of the battery within a predetermined range on the basis of the state of charge of the battery, and set a lower one of the basic required charging rate and the limit charging value as a target charging value. With this configuration, charging control is executed on the basis of the set target charging value, so it is possible to suitably prevent vibrations and noise.

In the control system, the controller may be configured to set the basic required charging rate such that the basic required charging rate increases as the state of charge of the battery decreases. With this configuration, as the state of charge of the battery decreases, the basic required charging rate increases, so it is possible to keep the state of charge of the battery within an optimal range.

In the control system, the controller may be configured to decrease the basic required charging rate when a vehicle speed is higher than or equal to a predetermined vehicle speed as compared to when the vehicle speed is lower than the predetermined vehicle speed. With this configuration, when a brake pedal is depressed in a high vehicle speed state, it is possible to ensure braking force that is generated by the electric motor.

In the control system, the electric motor may be configured to generate electric power by using the power of the engine.

The control system may further include a clutch. The clutch may be provided between the engine and the electric motor. The controller may be configured to engage the clutch at the time when the battery is charged with electric power generated by the electric motor by using the power of the engine. With this configuration, when the clutch is engaged, the power transmission path between the engine and the electric motor is formed, so the power of the engine is transmitted to the electric motor, and electric power is allowed to be generated by the electric motor.

In the control system, the transmission may be a step-shift automatic transmission. With this configuration, the engine rotation speed varies with the speed position of the transmission even at the same vehicle speed, so, particularly, when the speed position is high, the engine rotation speed decreases, and vibrations and noise tend to occur. In contrast, the limit charging value is decreased when the speed position is high, so it is possible to prevent occurrence of vibrations and noise by preventing a state where the engine is driven at a low rotation speed and high torque. In the control system, the transmission may be a continuously variable transmission.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1 is a view that illustrates the schematic configuration of a power transmission path from an engine and an electric motor, which constitute a hybrid vehicle to which the invention is suitably applied, to drive wheels, and is a view that illustrates a relevant portion of a control system provided in the vehicle in order to execute output control over the engine that functions as a driving force source, shift control over an automatic transmission, drive control over the electric motor, and the like;

DETAILED DESCRIPTION OF EMBODIMENTS

Here, suitably, a limit charging value is an upper limit value at or below which charging of a battery is allowed. A charging rate (electric energy) at which the battery is allowed to be charged increases as the limit charging value increases; whereas the charging rate (electric energy) at which the battery is allowed to be charged decreases as the limit charging value decreases.

Suitably, in the specification, the phrase that "the speed position of a transmission is high" indicates that the speed ratio of the transmission is small, in other words, the speed position is shifted to a speed position at which an engine rotation speed is set to a low speed. The phrase that "the speed position is low" indicates that the speed ratio of the transmission is large, in other words, the speed position is shifted to a speed position at which the engine rotation speed is set to a high speed.

Hereinafter, embodiments of the invention will be described in detail with reference to the accompanying drawings. In the following embodiments, the drawings are simplified or modified as needed, and the scale ratio, shape, and the like, of each component are not always drawn accurately.

First Embodiment

Figure 1:
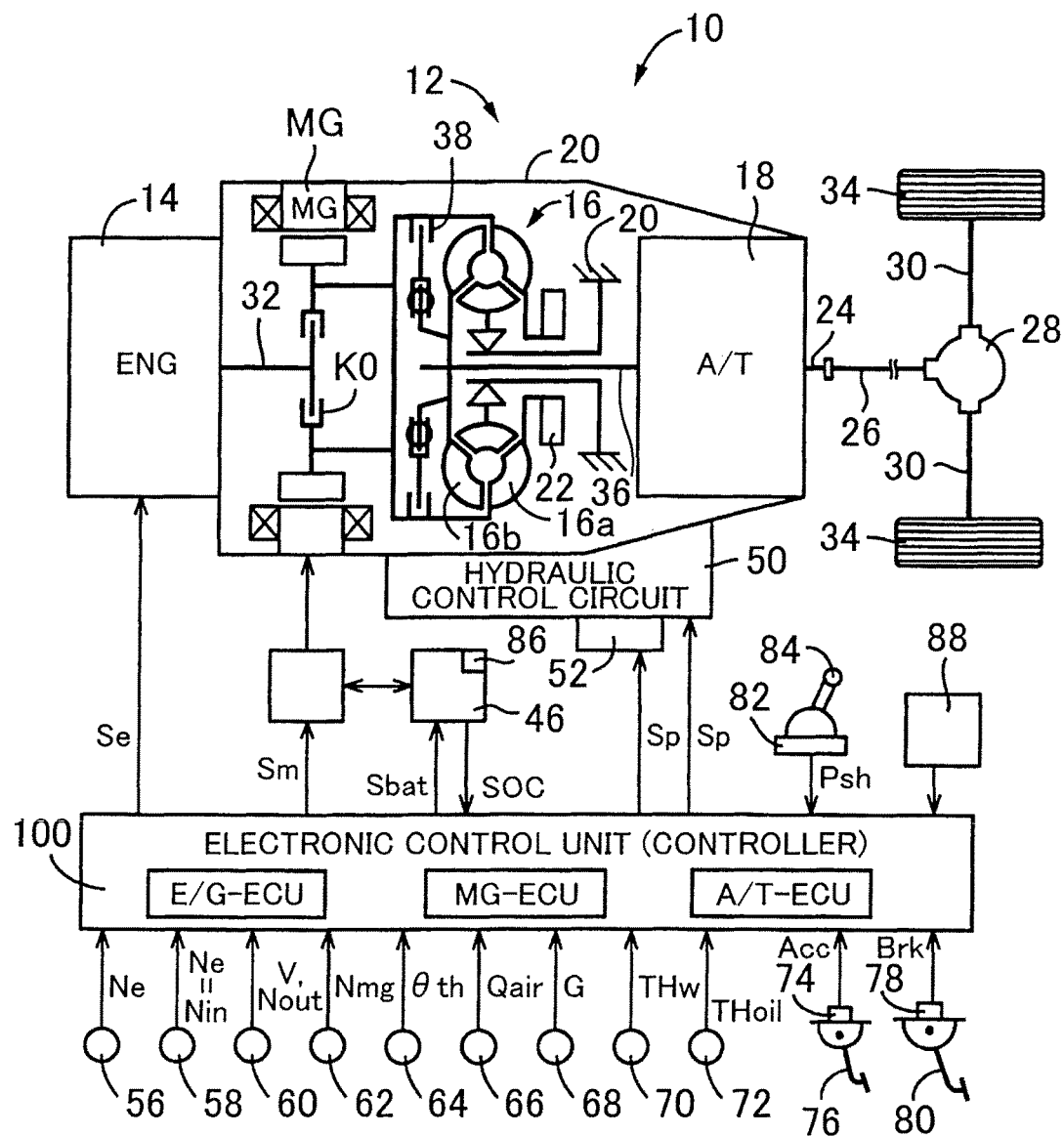

FIG. 1 is a view that illustrates the schematic configuration of a power transmission path from an engine 14 and an electric motor MG, which constitute a hybrid vehicle 10 (hereinafter, referred to as vehicle 10) to which the invention is suitably applied, to drive wheels 34, and is a view that illustrates a relevant portion of a control system provided in the vehicle 10 in order to execute output control over the engine 14 that functions as a driving force source, shift control over an automatic transmission 18, drive control over the electric motor MG, and the like.

As shown in FIG. 1, a vehicle power transmission device 12 (hereinafter, referred to as power transmission device 12) includes an engine separating clutch K0, the electric motor MG, a torque converter 16, an oil pump 22, the automatic transmission 18, and the like, in order from the engine 14 side in a transmission case 20 (hereinafter, referred to as case 20). The case 20 serves as a non-rotating member connected to a vehicle body by bolts, and the like. The power transmission device 12 includes a propeller shaft 26, a differential gear unit (differential gear) 28, a pair of axles 30, and the like. The propeller shaft 26 is coupled to an output shaft 24 that is an output rotating member of the automatic transmission 18. The differential gear unit 28 is coupled to the propeller shaft 26. The pair of axles 30 are coupled to the differential gear unit 28. The thus configured power transmission device 12 is, for example, suitably used for the front-engine, rear-drive (FR) vehicle 10. In the power transmission device 12, when the engine separating clutch K0 is engaged, the power of the engine 14 is transmitted from an engine coupling shaft 32 to the pair of drive wheels 34 sequentially via the engine separating clutch K0, the torque converter 16, the automatic transmission 18, the propeller shaft 26, the differential gear unit 28, the pair of axles 30, and the like. The engine coupling shaft 32 couples the engine 14 to the engine separating clutch K0. That is, the engine 14 is coupled to the drive wheels 34 such that power is transmittable.

The torque converter 16 is a fluid transmission device that transmits driving force, input to a pump impeller 16a, to the automatic transmission 18 side via fluid. The pump impeller 16a is coupled to the engine 14 sequentially via the engine separating clutch K0 and the engine coupling shaft 32, and is an input-side rotating element that receives driving force from the engine 14 and that is rotatable around its axis. A turbine impeller 16b of the torque converter 16 is an output-side rotating element of the torque converter 16. The turbine impeller 16b is coupled to a transmission input shaft 36 by spline fitting, or the like, so as to be relatively non-rotatable with respect to the transmission input shaft 36. The transmission input shaft 36 is an input rotating member of the automatic transmission 18. The torque converter 16 includes a lockup clutch 38. The lockup clutch 38 is a direct coupling clutch provided between the pump impeller 16a and the turbine impeller 16b, and is placed in an engaged state, a slipped state or a released state through hydraulic pressure control, or the like.

The electric motor MG is a so-called motor generator having the function of a motor that generates mechanical driving force from electric energy and the function of a generator that generates electric energy from mechanical energy. In other words, the electric motor MG can function as a driving force source that generates driving force instead of the engine 14 that is a power source or together with the engine 14. In addition, the electric motor MG generates electric energy through regeneration from driving force generated by the engine 14 or driven force (mechanical energy) input from the drive wheels 34 side, and operates to, for example, store the electric energy in a battery 46 via an inverter 40, a step-up converter (not shown), and the like. The battery 46 is an electrical storage device. The electric motor MG is operably coupled to the pump impeller 16a, and power is transmitted to each other between the electric motor MG and the pump impeller 16a. Thus, the electric motor MG, as well as the engine 14, is coupled to the transmission input shaft 36 such that power is transmittable. The electric motor MG is connected so as to exchange electric power with the battery 46 via the inverter 40, the step-up converter (not shown), and the like. When the vehicle travels with the use of the electric motor MG as the driving force source, the engine separating clutch K0 is released, and the power of the electric motor MG is transmitted to the pair of drive wheels 34 sequentially via the torque converter 16, the automatic transmission 18, the propeller shaft 26, the differential gear unit 28, the pair of axles 30, and the like. That is, the electric motor MG is coupled to the drive wheels 34 such that power is transmittable.

The oil pump 22 is coupled to the pump impeller 16a, and is a mechanical oil pump that generates hydraulic pressure by being rotationally driven by the engine 14 (or the electric motor MG) for executing shift control over the automatic transmission 18, controlling the torque capacity of the lockup clutch 38, controlling engagement or release of the engine separating clutch K0, and supplying lubricant to the portions of the power transmission path of the vehicle 10. The power transmission device 12 includes an electric oil pump 52 that is driven by an electric motor (not shown), and, when the oil pump 22 is not driven, for example, when the vehicle is stopped, generates hydraulic pressure by supplementarily operating the electric oil pump 52.

The engine separating clutch K0 provided between the engine 14 and the electric motor MG is, for example, a wet-type multi-disc hydraulic friction engagement device in which a plurality of friction plates are stacked on top of each other are pressed by a hydraulic actuator, and undergoes engagement/release control by a hydraulic control circuit 50 provided in the power transmission device 12 using a hydraulic pressure, generated by the oil pump 22 or the electric oil pump 52, as a source pressure. In the engagement/release control, the torque capacity that the engine separating clutch K0 is able to transmit, that is, the engagement force of the engine separating clutch K0, is, for example, continuously varied by regulating a pressure of a linear solenoid valve, or the like, in the hydraulic control circuit 50. The engine separating clutch K0 includes a pair of clutch rotating members (a clutch hub and a clutch drum) that are relatively rotatable in a released state of the engine separating clutch K0. One of the clutch rotating members (clutch hub) is coupled to the engine coupling shaft 32 so as to be relatively non-rotatable; whereas the other one of the clutch rotating members (clutch drum) is coupled to the pump impeller 16a of the torque converter 16 so as to be relatively non-rotatable. With this configuration, when the engine separating clutch K0 is in the engaged state, the pump impeller 16a is caused to integrally rotate with the engine 14 via the engine coupling shaft 32. That is, in the engaged state of the engine separating clutch K0, driving force from the engine 14 is input to the pump impeller 16a. On the other hand, in the released state of the engine separating clutch K0, power transmission between the pump impeller 16a and the engine 14 is interrupted. As described above, the electric motor MG is operably coupled to the pump impeller 16a, so the engine separating clutch K0 functions as a clutch that connects or disconnects the power transmission path between the engine 14 and the electric motor MG. A so-called normally-open clutch is used as the engine separating clutch K0 according to the present embodiment. The normally-open clutch increases its torque capacity (engagement force) in proportion to a hydraulic pressure, and is placed in the released state in a state where no hydraulic pressure is supplied.

The automatic transmission 18 is coupled to the electric motor MG not via the engine separating clutch K0 such that power is transmittable. The automatic transmission 18 is interposed in the power transmission path between the drive wheels 34 and both the engine 14 and the electric motor MG. The automatic transmission 18 transmits power from the driving force sources (the engine 14 and the electric motor MG) to the drive wheels 34 side. The automatic transmission 18 is, for example, a planetary gear-type multistage transmission that functions as a step-shift automatic transmission in which a plurality of speed positions (gear positions) are selectively established through shifting by switching an engaged one of a plurality of engagement devices, for example, hydraulic friction engagement devices, such as clutches C and brakes B (that is, engaging one of the hydraulic friction engagement devices and releasing another one of the hydraulic friction engagement devices). That is, the automatic transmission 18 is a step-shift transmission that carries out so-called clutch-to-clutch shift that is widely used in a known vehicle, and outputs the rotation of the transmission input shaft 36 from the output shaft 24 while changing the speed of the rotation. The transmission input shaft 36 is also a turbine shaft that is rotationally driven by the turbine impeller 16b of the torque converter 16. Then, in the automatic transmission 18, a predetermined gear position (speed position) is established through engagement/release control over each of the clutches C and brakes B on the basis of driver's accelerator operation, a vehicle speed V, and the like. The automatic transmission 18 is placed in a neutral state when all of the clutches C and brakes B of the automatic transmission 18 are released, and the power transmission path between the drive wheels 34 and both the engine 14 and the electric motor MG is disconnected. The automatic transmission 18 corresponds to a transmission according to the invention.

Referring back to FIG. 1, the vehicle 10 includes an electronic control unit 100 that includes a controller associated with, for example, hybrid drive control, or the like. The electronic control unit 100 is configured to include a so-called microcomputer that includes, for example, a CPU, a RAM, a ROM, an input/output interface, and the like. The CPU executes various controls over the vehicle 10 by executing signal processing in accordance with programs prestored in the ROM while utilizing the temporary storage function of the RAM. For example, the electronic control unit 100 is configured to execute output control over the engine 14, drive control over the electric motor MG, including regenerative control over the electric motor MG, shift control over the automatic transmission 18, torque capacity control over the lockup clutch 38, torque capacity control over the engine separating clutch K0, and the like, and is, where necessary, separated into an engine control electronic control unit (E/G-ECU), an electric motor control electronic control unit (MG-ECU), a hydraulic control electronic control unit (A/T-ECU) (shift control electronic control unit), and the like.

For example, a signal indicating an engine rotation speed Ne, a signal indicating a transmission input rotation speed Nin, a signal indicating a transmission output rotation speed Nout, a signal indicating an electric motor rotation speed Nmg, a signal indicating a throttle valve opening degree θth, a signal indicating an intake air amount Qair of the engine 14, a signal indicating a longitudinal acceleration G (or a longitudinal deceleration G) of the vehicle 10, a signal indicating a coolant temperature THw of the engine 14, a signal indicating a fluid temperature THoil of hydraulic fluid in the hydraulic control circuit 50, a signal indicating an accelerator operation amount Acc, a signal indicating a brake operation amount Brk, a signal indicating a lever position (shift operation position, shift position, operation position) Psh of a shift lever 84, a state of charge (charged level, remaining level of charge) SOC of the battery 46, and the like, are supplied to the electronic control unit 100. The engine rotation speed Ne is the rotation speed of the engine 14, and is detected by an engine rotation speed sensor 56. The transmission input rotation speed Nin is a turbine rotation speed Nt of the torque converter 16, that is, the rotation speed of the transmission input shaft 36, as the input rotation speed of the automatic transmission 18, and is detected by a turbine rotation speed sensor 58. The transmission output rotation speed Nout is the rotation speed of the output shaft 24, corresponds to the vehicle speed V, the rotation speed of the propeller shaft 26, and the like, as a vehicle speed related value, and is detected by an output shaft rotation speed sensor 60. The electric motor rotation speed Nmg is the rotation speed of the electric motor MG, and is detected by an electric motor rotation speed sensor 62. The throttle valve opening degree θth is the opening degree of an electronic throttle valve (not shown), and is detected by a throttle sensor 64. The intake air amount Qair is detected by an intake air amount sensor 66. The longitudinal acceleration G (or the longitudinal deceleration G) is detected by an acceleration sensor 68. The coolant temperature THw is detected by a coolant temperature sensor 70. The fluid temperature THoil is detected by a fluid temperature sensor 72. The accelerator operation amount Acc is the operation amount of an accelerator pedal 76 as a driver's required driving force (driver requesting power) to the vehicle 10, and is detected by an accelerator operation amount sensor 74. The brake operation amount Brk is the operation amount of a brake pedal 80 as a driver's required braking force (driver requesting deceleration) to the vehicle 10, and is detected by a foot brake sensor 78. The lever position Psh, such as known "P", "N", "D", "R", "S" positions, and the like, is detected by a shift position sensor 82. The state of charge SOC is calculated on the basis of a voltage, a current and a battery temperature, which are detected by a battery monitoring unit 86. In addition, electric power is supplied from an auxiliary battery 88 to the electronic control unit 100. The auxiliary battery 88 is charged with electric power stepped down by a DC/DC converter (not shown).

For example, an engine output control command signal Se for output control over the engine 14, an electric motor control command signal Sm for controlling operation of the electric motor MG, a hydraulic pressure command signal Sp for actuating electromagnetic valves (solenoid valves), the electric oil pump 52, and the like, included in the hydraulic control circuit 50 in order to control the hydraulic actuator of the engine separating clutch K0 and the hydraulic actuators of the clutches C and brakes B of the automatic transmission 18, and the like, are output from the electronic control unit 100.

Figure 2:
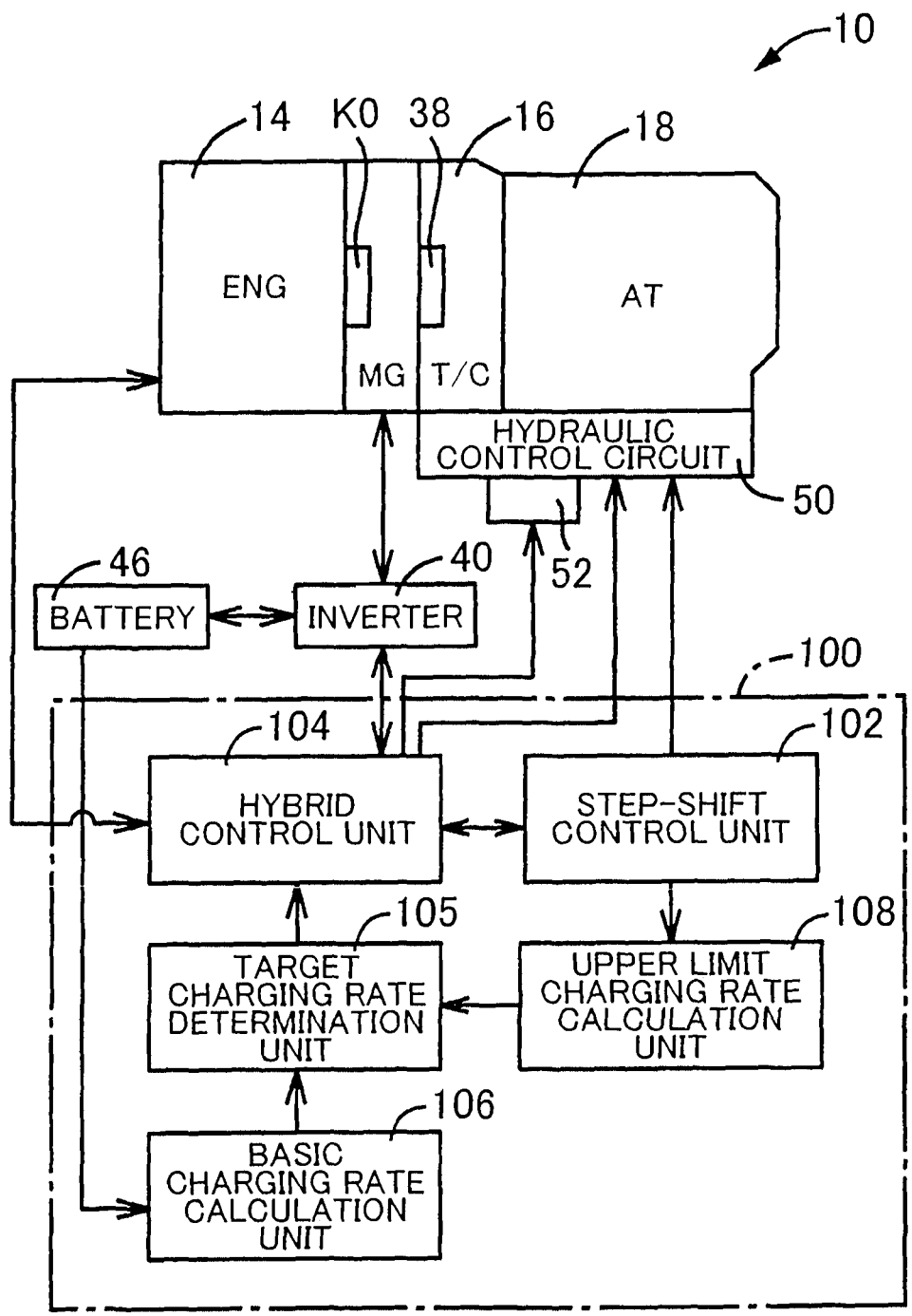
FIG. 2 is a functional block diagram that illustrates a relevant portion of control functions implemented by an electronic control unit shown in FIG. 1.

FIG. 2 is a functional block diagram that illustrates a relevant portion of control functions implemented by the electronic control unit 100. In FIG. 2, a step-shift control unit 102 (step-shift control means) functions as a shift control unit that shifts the automatic transmission 18. The step-shift control unit 102, for example, determines whether to shift the automatic transmission 18, that is, a speed position to which the automatic transmission 18 should be shifted, on the basis of a vehicle state indicated by the actual vehicle speed V and the accelerator operation amount Acc by consulting a prestored known correlation (shift line map, shift map) having upshift lines and downshift lines by using the vehicle speed V and the accelerator operation amount Acc (or the throttle opening degree θth) as variables. Then, the step-shift control unit 102 executes automatic shift control over the automatic transmission 18 such that the determined speed position is obtained. For example, the step-shift control unit 102 determines that a request to downshift the automatic transmission 18 is issued when the accelerator operation amount Acc (vehicle required torque) crosses any one of the downshift lines toward a high accelerator operation amount (high vehicle required torque) side with an increase in the accelerator operation amount Acc as a result of further depressing operation of the accelerator pedal 76, and executes downshift control over the automatic transmission 18 corresponding to the downshift line. At this time, the step-shift control unit 102, for example, outputs the command (shift output command, hydraulic pressure command) Sp for engaging and/or releasing the engagement devices associated with the shift of the automatic transmission 18 to the hydraulic control circuit 50 such that a speed position is achieved in accordance with a prestored predetermined engagement operation chart. The hydraulic control circuit 50 actuates the hydraulic actuators of the engagement devices associated with the shift by actuating the solenoid valves in the hydraulic control circuit 50 in accordance with the command Sp such that the automatic transmission 18 is shifted by releasing the releasing-side clutch and engaging the engaging-side clutch.

A hybrid control unit 104 (hybrid control means) includes the function of an engine drive control unit that executes drive control over the engine 14 and the function of an electric motor operation control unit that controls operation of the electric motor MG via the inverter 40 as the driving force source or the generator. The hybrid control unit 104 executes hybrid drive control, or the like, with the use of the engine 14 and the electric motor MG through those control functions. For example, the hybrid control unit 104 calculates the driver's required torque Tr* on the basis of the accelerator operation amount Acc and the vehicle speed V, and controls the driving force sources in consideration of a transmission loss, an auxiliary load, the speed position of the automatic transmission 18, the state of charge SOC of the battery 46, and the like, such that the required torque Tr* is obtained by the output torque of the driving force sources (the engine 14 and the electric motor MG).

More specifically, for example, within a range in which the required torque Tr* is provided by only the output torque Tmg of the electric motor MG (electric motor torque), the hybrid control unit 104 sets a traveling mode to a motor running mode (hereinafter, EV running mode), and carries out motor running (EV running) in which only the electric motor MG is used as the driving force source. On the other hand, for example, within a range in which the vehicle required torque is not provided without at least the output torque (engine torque) Te of the engine 14, the hybrid control unit 104 sets the traveling mode to an engine running mode, and carries out engine running in which at least the engine 14 is used as the driving force source.

When the hybrid control unit 104 carries out EV running, the hybrid control unit 104 disconnects the power transmission path between the engine 14 and the torque converter 16 by releasing the engine separating clutch K0, and causes the electric motor MG to output the electric motor torque Tmg required for motor running. On the other hand, when the hybrid control unit 104 carries out engine running, the hybrid control unit 104 transmits driving force from the engine 14 to the pump impeller 16a by engaging the engine separating clutch K0, and, where necessary, causes the electric motor MG to output assist torque. For example, when the hybrid control unit 104 does not drive the oil pump 22, for example, during a stop of the vehicle, the hybrid control unit 104 prevents shortage of hydraulic fluid by supplementarily actuating the electric oil pump 52.

When the depression amount of the accelerator pedal 76, for example, increases and the vehicle required torque increases during EV running, and then the electric motor torque Tmg required for EV running corresponding to the vehicle required torque exceeds a predetermined EV running torque range in which EV running is possible, the hybrid control unit 104 shifts the traveling mode from the EV running mode to the engine running mode, and carries out engine running by starting the engine 14. At the time of a start of the engine 14, the hybrid control unit 104 engages the engine separating clutch K0 toward complete engagement and rotationally drives the engine 14 by transmitting engine start torque Tmgs for starting the engine from the electric motor MG via the engine separating clutch K0. Thus, the engine 14 is started by controlling engine ignition, fuel supply, and the like, while increasing the engine rotation speed Ne to a predetermined rotation speed or higher. The hybrid control unit 104 quickly completely engages the engine separating clutch K0 after the start of the engine 14.

When the state of charge SOC of the battery 46 becomes lower than or equal to a predetermined value SOC* (when a predetermined condition on which the battery 46 should be charged is satisfied) set in advance, a charging request for charging the battery 46 is output. At this time, the hybrid control unit 104 transmits the driver's required torque Tr* to the drive wheels 34 by engaging the engine separating clutch K0 and driving the engine 14, and generates electric power by rotationally driving the electric motor MG by using the remaining part of the power of the engine 14. Thus, the battery 46 is charged. At this time, the hybrid control unit 104 sequentially calculates a target charging value Pb* of the battery 46, and generates electric power by using the power of the engine 14 within the range of the target charging value Pb*.

In engine running that accompanies charging with the use of the electric motor MG, the target charging value Pb* (target charging power) of the battery 46 is determined on the basis of the state of charge SOC of the battery 46, the vehicle speed V, and the like, in the existing art. For example, when the state of charge SOC of the battery 46 becomes lower than or equal to the predetermined value SOC*, charging is carried out with the use of the electric motor MG, and the target charging value Pb* is set so as to increase with a decrease in the state of charge SOC. At a low vehicle speed, the target charging value Pb* is set so as to decrease with a decrease in the vehicle speed V. When the vehicle speed V is low, the engine rotation speed Ne decreases, so the engine torque Te increases for the target charging value Pb*. An exciting force of vibrations increases due to the above, so vibrations and noise easily occur during traveling. In contrast, by decreasing the target charging value Pb* in a traveling state where the vehicle speed V is low, occurrence of vibrations and noise is prevented.

However, in the power transmission device 12 for a vehicle including the automatic transmission 18, such as the hybrid vehicle 10, the engine rotation speed Ne varies with the speed position of the automatic transmission 18. Specifically, the engine rotation speed Ne decreases as the speed position of the automatic transmission 18 becomes higher, that is, as the speed ratio reduces. Thus, even when the same target charging value Pb* is achieved, the engine 14 is rotated at a lower rotation speed and driven at a higher torque as the speed position becomes higher, with the result that the exciting force of vibrations increases. Therefore, vibrations and noise tend to occur. This phenomenon is particularly problematic at a low vehicle speed. When the target charging value Pb* is constantly decreased in order to suppress occurrence of vibrations and noise, the charging rate (or the amount of charge) decreases, so the state of charge SOC of the battery 46 may fall outside an appropriate range (for example, 40% to 60%). Therefore, the electronic control unit 100 executes control for keeping the state of charge SOC of the battery 46 within an appropriate range while suppressing occurrence of vibrations and noise during traveling by changing the target charging value Pb* on the basis of the speed position of the automatic transmission 18. Hereinafter, the control operations of the electronic control unit 100, which are a relevant portion of the invention, will be described. The invention is applicable irrespective of the engagement state of the lockup clutch 38 of the torque converter 16; however, the lockup clutch 38 is engaged in the present embodiment in the following description.

Referring back to FIG. 2, a target charging value determination unit 105 (target charging value determination means) determines a lower one of a basic required charging rate Pa that is calculated by a basic charging rate calculation unit 106 and an upper limit charging rate Plim that is calculated by an upper limit charging rate calculation unit 108, as the target charging value Pb*.

Figure 3:
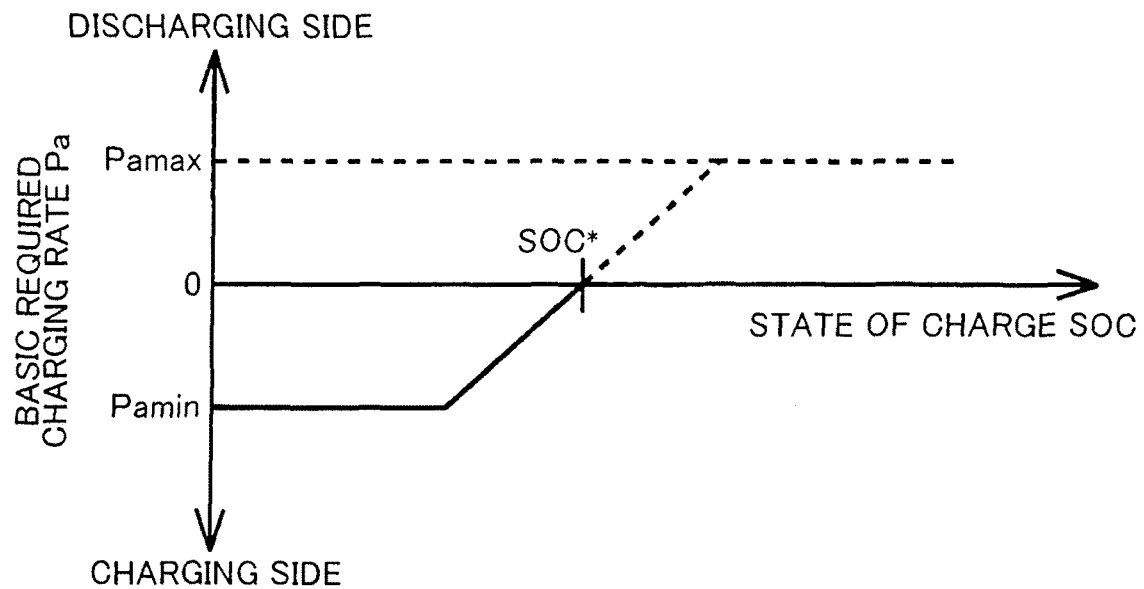
FIG. 3 is a map that shows the correlation between a state of charge and a basic required charging rate.

The basic charging rate calculation unit 106 (basic charging rate calculation means) calculates the basic required charging rate Pa on the basis of the state of charge SOC and the vehicle speed V by consulting preset correlations. FIG. 3 is a prestored map that shows the correlation between the state of charge SOC and the basic required charging rate Pa. As shown in FIG. 3, when the state of charge SOC becomes lower than or equal to the predetermined value SOC*, a charging request for charging the battery 46 is output, and the basic required charging rate Pa increases as the state of charge SOC decreases. Pamax and Pamin in the map are an allowable discharging power (Pamax) and an allowable charging power (Pamin) of the battery 46, and vary with the battery temperature, and the like.

Figure 4:
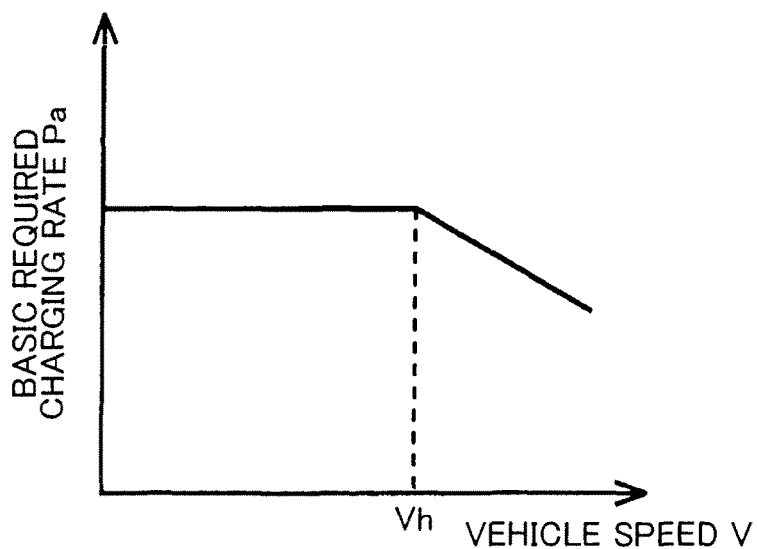
FIG. 4 is a map that shows the correlation between a vehicle speed and a basic required charging rate.

The basic charging rate calculation unit 106 decreases the basic required charging rate Pa in a high vehicle speed region in which the vehicle speed V is higher than or equal to a preset high vehicle speed determination value Vh as compared to a low vehicle speed region till then as shown in the map of the correlation between the vehicle speed V and the basic required charging rate Pa in FIG. 4. When the brake pedal 80 is depressed in the high vehicle speed region, braking force (regenerative force) is generated by the electric motor MG in order to decelerate the vehicle. However, when the state of charge SOC of the battery 46 is high in the high vehicle speed region, braking force generated by the electric motor MG at the time when the brake pedal 80 is depressed is limited in order to keep the state of charge SOC within the appropriate range. Therefore, the basic charging rate calculation unit 106 decreases the basic required charging rate Pa in the high vehicle speed region in which the vehicle speed is higher than or equal to the preset high vehicle speed determination value Vh in order to ensure braking force generated by the electric motor MG in a high-speed traveling state.

The basic required charging rate Pa, which is calculated by the basic charging rate calculation unit 106, is a charging rate at which the state of charge SOC of the battery 46 is kept within the preset range of an allowable control upper limit value and an allowable control lower limit value.

Figure 5:
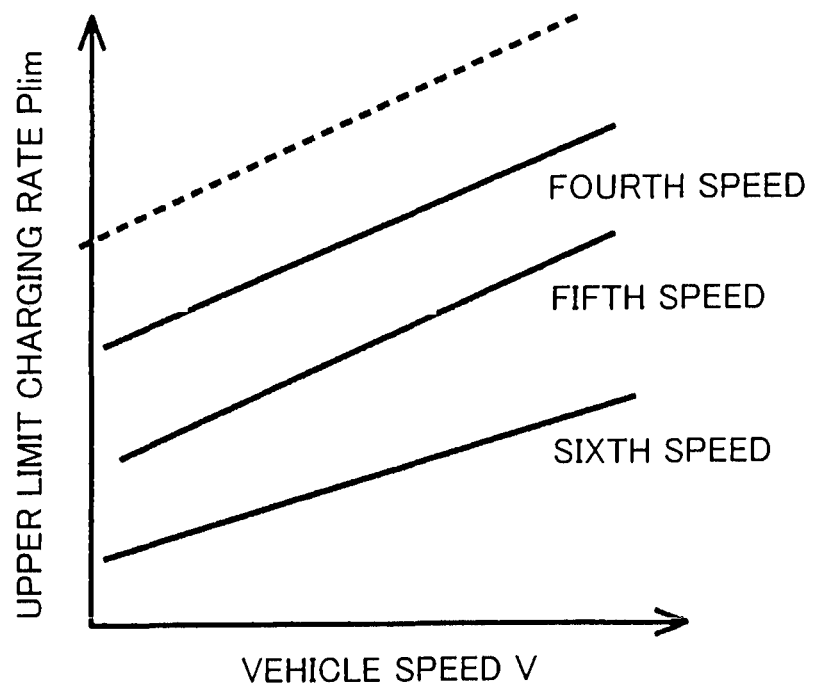
FIG. 5 is a map that shows the correlation between both a vehicle speed and a speed position of an automatic transmission and an upper limit charging rate.

The upper limit charging rate calculation unit 108 (upper limit charging rate calculation means) calculates the upper limit charging rate Plim on the basis of the vehicle speed V and the speed position of the automatic transmission 18. FIG. 5 is a map that shows the correlation between the upper limit charging rate Plim and both the vehicle speed V and the speed position of the automatic transmission 18, and is obtained and stored in advance. As shown in FIG. 5, the upper limit charging rate Plim decreases as the vehicle speed V decreases. That is, the upper limit charging rate Plim is set so as to be lower when the vehicle speed V is low than when the vehicle speed V is high. When the vehicle speed V decreases, the engine rotation speed Ne also decreases. Even when the same charging rate is achieved, the engine torque Te increases as the engine rotation speed Ne decreases. That is, because the engine 14 is driven at a low rotation speed and high torque, the exciting force of vibrations also increases, so vibrations and noise also increase accordingly. Therefore, the upper limit charging rate calculation unit 108 sets the upper limit charging rate Plim such that the upper limit charging rate Plim decreases as the vehicle speed V decreases. When controlled in this way, the upper limit charging rate Plim decreases even when the vehicle speed V decreases and the engine rotation speed Ne decreases, so the engine torque Te also reduces, and occurrence of vibrations and noise during traveling is suppressed. The upper limit charging rate Plim may be regarded as a limit charging value according to the invention.

In addition, as shown in FIG. 5, the upper limit charging rate Plim is set such that the upper limit charging rate Plim is lower when the speed position of the automatic transmission 18 is high than when the speed position is low. When the speed position becomes higher, the engine rotation speed Ne decreases even at the same vehicle speed V. Thus, even when the same charging rate is achieved, the engine rotation speed Ne decreases when the speed position becomes higher, so the engine torque Te increases. Thus, the engine 14 is driven at a low rotation speed and high torque, and vibrations and noise also increase accordingly. Therefore, the upper limit charging rate calculation unit 108 sets the upper limit charging rate Plim such that the upper limit charging rate Plim decreases as the speed position becomes higher. Thus, the engine torque Te is reduced even when the engine rotation speed Ne decreases, so occurrence of vibrations and noise during traveling is suppressed.

The upper limit charging rate Plim is empirically obtained in advance, and the upper limit charging rate Plim is set to a threshold at or below which the driver does not experience vibrations or noise that is generated at the time when the engine 14 is driven to output power. In the present embodiment, the case where the accelerator operation amount Acc is relatively small in a relatively low vehicle speed region, that is, the case where a required driving power Pr* is relatively low and a driving power Pe* required for the engine 14 is also relatively low, is assumed. Thus, in the present embodiment, the upper limit charging rate Plim is uniformly calculated by setting a predetermined value Pc as the driving power Pe* in the range in which the driving power Pe* is lower than or equal to the predetermined value Pc.

The upper limit charging rate Plim, which is calculated by the upper limit charging rate calculation unit 108, is, in other words, a value for the purpose of suppressing occurrence of vibrations and noise by preventing the low rotation speed and high torque state of the engine 14. That is, electric power is generated by the electric motor MG by using the power of the engine 14 within the range of the upper limit charging rate Plim. Thus, occurrence of vibrations and noise during traveling is suppressed.

The target charging value determination unit 105 sets a lower one of the basic required charging rate Pa calculated by the basic charging rate calculation unit 106 and the upper limit charging rate Plim calculated by the upper limit charging rate calculation unit 108, as the target charging value Pb*. For example, when the basic required charging rate Pa is higher than the upper limit charging rate Plim, the target charging value determination unit 105 sets the upper limit charging rate Plim as the target charging value Pb*. When controlled in this way, the charging rate is limited by the upper limit charging rate Plim, so the engine torque Te is suppressed and the charging rate decreases. However, occurrence of vibrations and noise during traveling is suppressed. When the upper limit charging rate Plim is higher than the basic required charging rate Pa, the target charging value determination unit 105 sets the basic required charging rate Pa as the target charging value Pb*. When controlled in this way, charging is carried out using the basic required charging rate Pa as the target charging value, so the state of charge SOC is kept within the appropriate range. Because the basic required charging rate Pa is lower than the upper limit charging rate Plim, the engine torque Te also reduces, so occurrence of vibrations and noise during traveling is suppressed.

Figure 6:
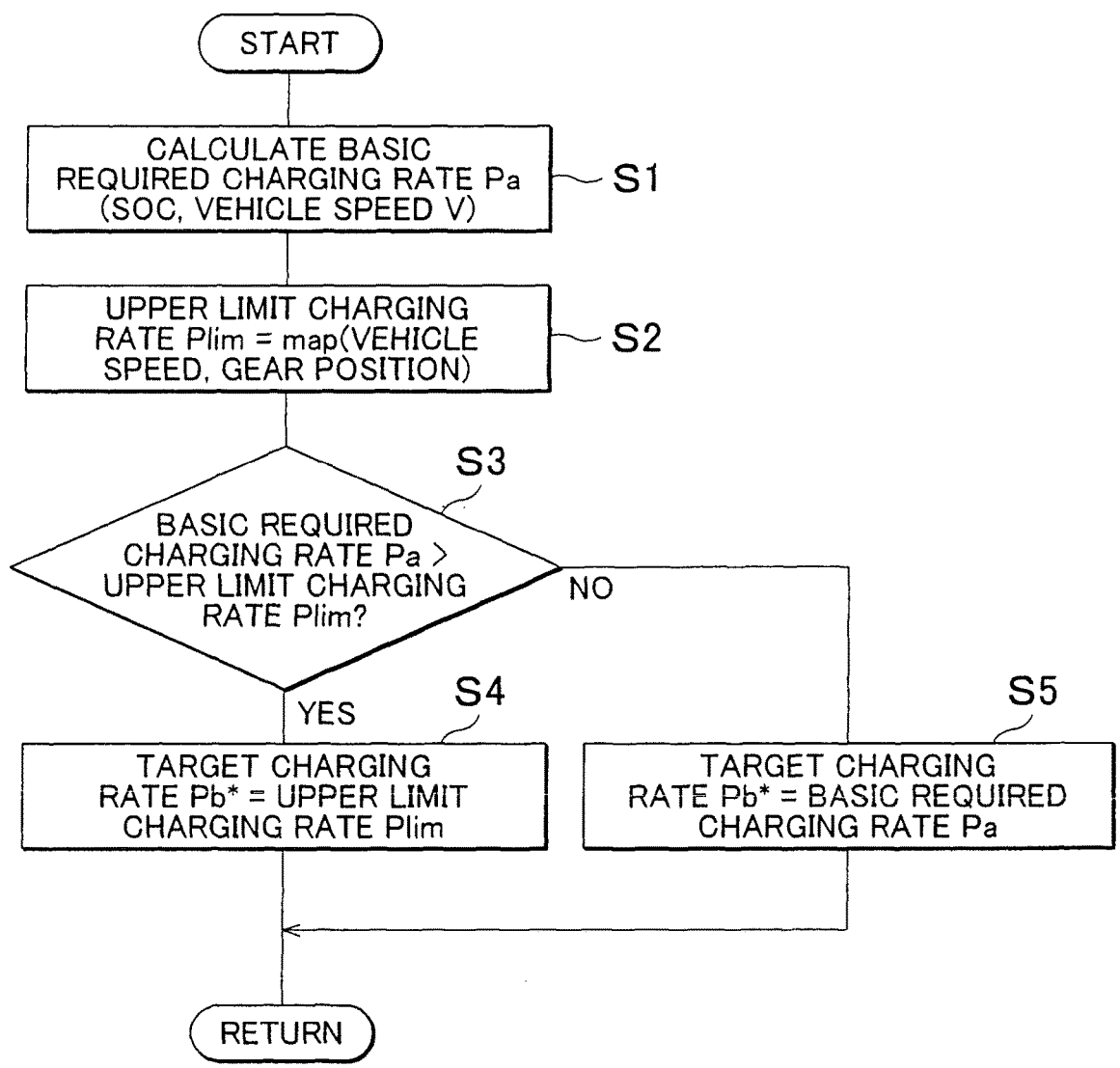
FIG. 6 is a flowchart that illustrates a relevant portion of control operations of the electronic control unit shown in FIG. 1, that is, control operations that are able to suppress vibrations and noise that occur during traveling while keeping the state of charge within an appropriate range.

FIG. 6 is a flowchart that illustrates a relevant portion of control operations of the electronic control unit 100, that is, control operations that are able to suppress vibrations and noise that occur during traveling while keeping the state of charge SOC with the appropriate range. For example, the flowchart is repeatedly executed in an extremely short cycle time of about several milliseconds to several tens of milliseconds.

In step S1 (hereinafter, step is omitted) corresponding to the basic charging rate calculation unit 106, the basic required charging rate Pa is calculated on the basis of the state of charge SOC and the vehicle speed V. The basic required charging rate Pa is a value for the purpose of keeping the state of charge SOC within the appropriate range. Subsequently, in S2 corresponding to the upper limit charging rate calculation unit 108, the upper limit charging rate Plim based on the vehicle speed V and the speed position (gear position, speed ratio) of the automatic transmission 18 is calculated. The upper limit charging rate Plim is a value for the purpose of suppressing vibrations and noise that occur during traveling by preventing a high torque state of the engine 14. In S3 corresponding to the target charging value determination unit 105, it is determined whether the basic required charging rate Pa calculated in S1 is higher than the upper limit charging rate Plim calculated in S2. When affirmative determination is made in S1, the upper limit charging rate Plin is set for the target charging value Pb* in S4 corresponding to the target charging value determination unit 105. Thus, although the charging rate is decreased, occurrence of vibrations and noise during traveling is suppressed. When negative determination is made in S3, the basic required charging rate Pa is set for the target charging value Pb* in S5 corresponding to the target charging value determination unit 105. Thus, the state of charge SOC is kept within the appropriate range, and occurrence of vibrations and noise during traveling is also suppressed.

As described above, according to the present embodiment, the upper limit charging rate Plim is more limited when the speed position of the automatic transmission 18 is high than when the speed position is low, so the engine 14 is hard to enter a high torque state even when the sped position is high. Thus, it is possible to suppress vibrations and noise that tend to occur at the time when the engine 14 is driven at a low rotation speed and high torque. On the other hand, the upper limit charging rate Plim is higher when the speed position is low than when the speed position is high, so the charging rate also increases, and it is possible to keep the state of charge SOC of the battery 46 within the appropriate range. In this way, occurrence of vibrations and noise is suppressed by decreasing the upper limit charging rate Plim when the speed position is high, and the appropriate charging rate is set when the speed position is low. Thus, it is possible to achieve both suppressing occurrence of vibrations and noise and keeping the state of charge SOC of the battery 46.

According to the present embodiment, the upper limit charging rate Plim is set so as to be higher when the vehicle speed V is high than when the vehicle speed V is low. With this configuration, the engine rotation speed Ne decreases as the vehicle speed V decreases, and the upper limit charging rate Plim decreases accordingly, so an increase in the torque of the engine 14 is suppressed, and occurrence of vibrations and noise during traveling is suppressed.

According to the present embodiment, the basic required charging rate Pa, at which the state of charge SOC of the battery 46 is kept within the predetermined range, is calculated on the basis of the state of charge SOC of the battery 46, and a lower one of the basic required charging rate Pa and the upper limit charging rate Plim is set for the target charging value Pb*. With this configuration, charging control is executed by using the set target charging value Pb* as a target, so it is possible to suitably prevent vibrations and noise.

According to the present embodiment, the basic required charging rate Pa increases as the state of charge SOC of the battery 46 decreases. With this configuration, as the state of charge SOC of the battery 46 decreases, the basic required charging rate Pa increases, so it is possible to keep the state of charge SOC of the battery 46 within the optimal range.

According to the present embodiment, the basic required charging rate Pa is decreased once the vehicle speed V falls within a region higher than or equal to the preset high vehicle speed determination value Vh as compared to when the vehicle speed V falls within a low vehicle speed region till then. With this configuration, when the brake pedal 80 is depressed in a high vehicle speed state, it is possible to ensure braking force that is generated by the electric motor MG.

According to the present embodiment, the engine separating clutch K0 is provided between the engine 14 and the electric motor MG, and the engine separating clutch K0 is engaged at the time when the battery 46 is charged with electric power generated by the electric motor MG by using the power of the engine 14. With this configuration, when the engine separating clutch K0 is engaged, the power transmission path between the engine 14 and the electric motor MG is formed, so the power of the engine 14 is transmitted to the electric motor MG, and electric power is allowed to be generated by the electric motor MG.

According to the present embodiment, the hybrid vehicle 10 includes the step-shift automatic transmission 18. With this configuration, the engine rotation speed Ne varies with the speed position of the automatic transmission 18 even at the same vehicle speed V, so, particularly, when the speed position is high, the engine rotation speed Ne decreases, and vibrations and noise tend to occur. In contrast, the upper limit charging rate Plim is decreased when the speed position is high, so it is possible to prevent occurrence of vibrations and noise by preventing a state where the engine 14 is driven at a low rotation speed and high torque.

Next, another embodiment of the invention will be described. In the following description, like reference numerals denote portions common to the above-described embodiment, and the description thereof is omitted.

Second Embodiment

Figure 7:
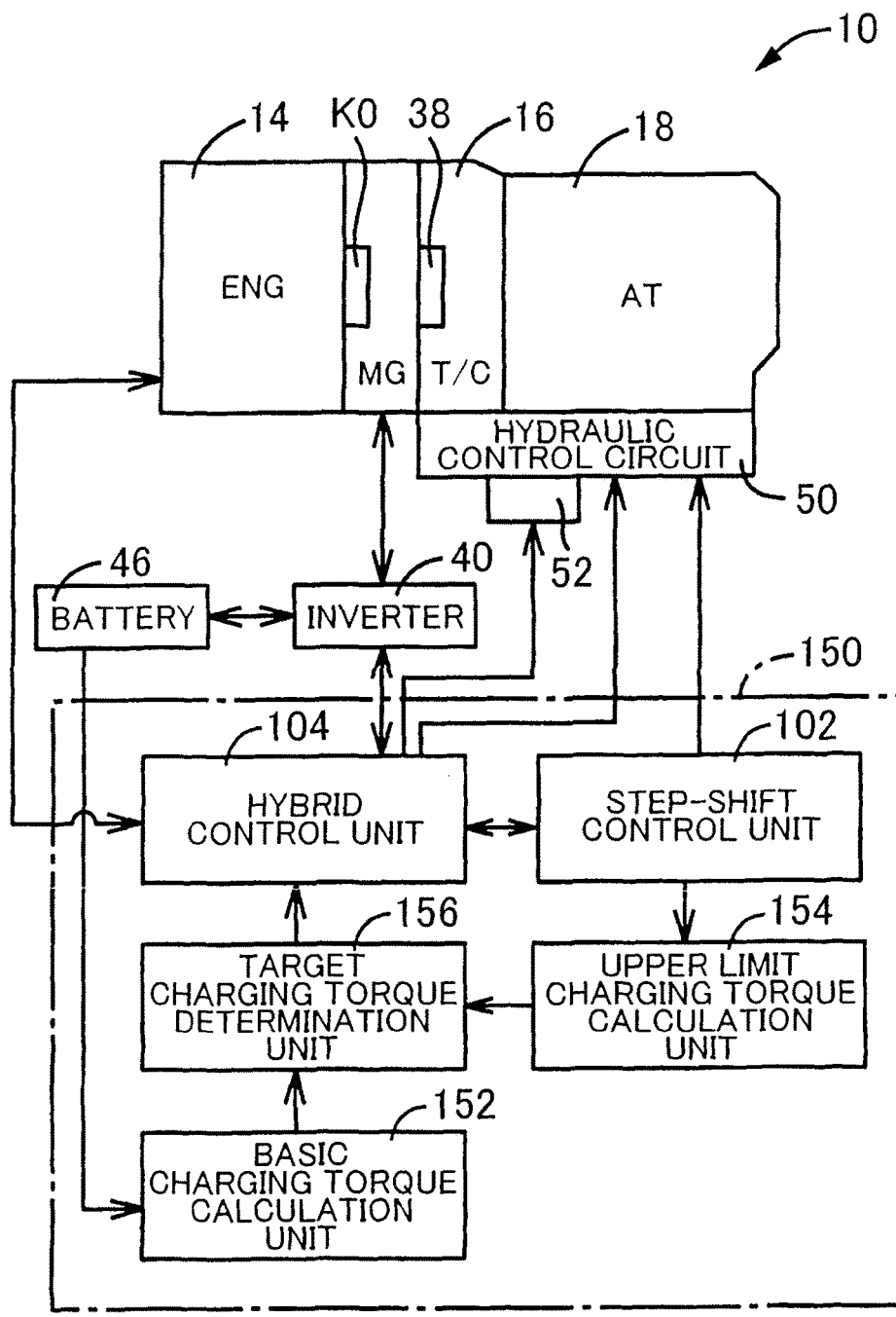
FIG. 7 is a functional block diagram that illustrates a relevant portion of control functions of an electronic control unit according to another embodiment of the invention.

In the above-described embodiment, all of the basic required charging rate Pa, the upper limit charging rate Plim and the target charging value Pb* are managed in the dimension of power; instead, these may be managed in the dimension of torque. FIG. 7 is a functional block diagram that illustrates a relevant portion of control functions of an electronic control unit 150 according to the present embodiment. A step-shift control unit and a hybrid control unit are basically not modified from those of the above-described embodiment, so like reference numerals denote components corresponding to those of the above-described embodiment and the description thereof is omitted.

A basic charging torque calculation unit 152 (basic charging torque calculation means) shown in FIG. 7 calculates a basic required charging torque Ta on the basis of the state of charge SOC and the vehicle speed V by consulting prestored correlations. The basic charging torque calculation unit 152, as well as the above-described basic charging rate calculation unit 106, calculates the basic required charging rate Pa on the basis of the state of Charge SOC by consulting the map shown in FIG. 3, or the like. In addition, the basic required charging torque Ta (=Pa/Ne, Pa/Nmg), obtained by converting the basic required charging rate Pa to engine torque, is calculated on the basis of the calculated basic required charging rate Pa and the engine rotation speed Ne (or the electric motor rotation speed Nmg of the electric motor MG). The basic required charging torque Ta is a torque that should be generated by the engine 14, and is a value for the purpose of keeping the state of charge SOC of the battery 46 within the appropriate range, as well as the basic required charging rate Pa.

Figure 8:
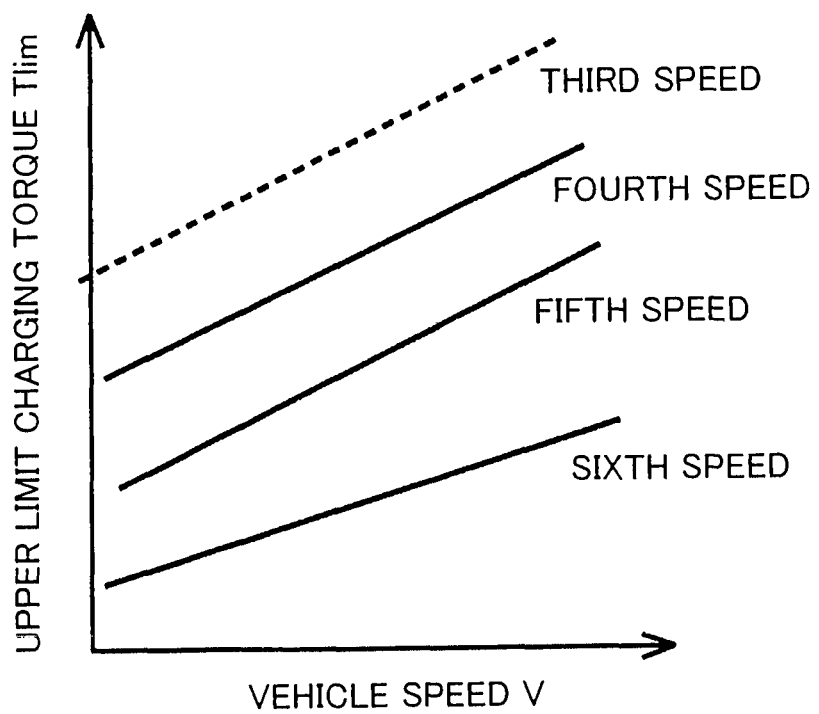
FIG. 8 is a map that shows the correlation between both a vehicle speed and the speed position of the automatic transmission and an upper limit charging torque.

An upper limit charging torque calculation unit 154 (upper limit charging torque calculation means) calculates an upper limit charging torque Tlim on the basis of the vehicle speed V and the speed position of the automatic transmission 18 by consulting the prestored map shown in FIG. 8. FIG. 8 is a map that shows the correlation between the upper limit charging torque Tlim and both the vehicle speed V and the speed position of the automatic transmission 18, and is obtained and stored in advance. As shown in FIG. 8, even the upper limit charging torque Tlim also reduces with a decrease in the vehicle speed V. Because the engine rotation speed Ne decreases as the vehicle speed V decreases, by reducing the upper limit charging torque Tlim accordingly, occurrence of vibrations and noise during traveling is suppressed by preventing the engine 14 from being operated at a low rotation speed and high torque. The upper limit charging torque Tlim may be regarded as the limit charging value according to the invention.

In addition, as shown in FIG. 8, the upper limit charging torque Tlim is set so as to be smaller when the speed position of the automatic transmission 18 is high than when the speed position is low. As the speed position becomes higher, the engine rotation speed Ne decreases for the same vehicle speed V. Thus, as the engine torque Te increases, the engine 14 is operated at a low rotation speed and high torque, so vibrations and noise during traveling increase. Therefore, the upper limit charging torque calculation unit 154 reduces the upper limit charging torque Tlim as the vehicle speed V decreases on the basis of the map shown in FIG. 8, and reduces the upper limit charging torque Tlim as the speed position becomes higher. In this way, the upper limit charging torque calculation unit 154 calculates the upper limit charging torque Tlim at or below which occurrence of vibrations and noise during traveling is suppressed.

The upper limit charging torque Tlim is empirically obtained in advance, and the upper limit charging torque Tlim is set to a threshold at or below which the driver does not experience vibrations or noise that is generated at the time when the engine 14 is driven. In the present embodiment as well, the case where the accelerator operation amount Acc is relatively small in a low vehicle speed region, that is, the case where the required driving torque Tr* is relatively small and the driving torque Te* required for the engine 14 is also relatively small, is assumed. The upper limit charging torque Tlim is uniformly calculated by setting a predetermined value Tc as the driving torque Te* in the range in which the driving torque Te* is smaller than or equal to the predetermined value Tc.

A target charging torque determination unit 156 (target charging torque determination means) determines a smaller one of the basic required charging torque Ta calculated by the basic charging torque calculation unit 152 and the upper limit charging torque Tlim calculated by the upper limit charging torque determination unit 154, as the target charging torque Tb*. For example, when the basic required charging torque Ta is larger than the upper limit charging torque Tlim, the target charging torque determination unit 156 determines the upper limit charging torque Tlim as the target charging torque Tb*. Thus, the target charging torque Tb* is limited by the upper limit charging torque Tlim, so a high torque state of the engine 14 is prevented, and occurrence of vibrations and noise during traveling is suppressed. When the upper limit charging torque Tlim is larger than the basic required charging torque Ta, the target charging torque determination unit 156 determines the basic required charging torque Ta as the target charging torque Tb*. Thus, the engine 14 is controlled such that the basic required charging torque Ta is output, and the state of charge SOC is appropriately controlled. Because the basic required charging torque Ta is smaller than the upper limit charging torque Tlim, occurrence of vibrations and noise during traveling is suppressed.

Figure 9:
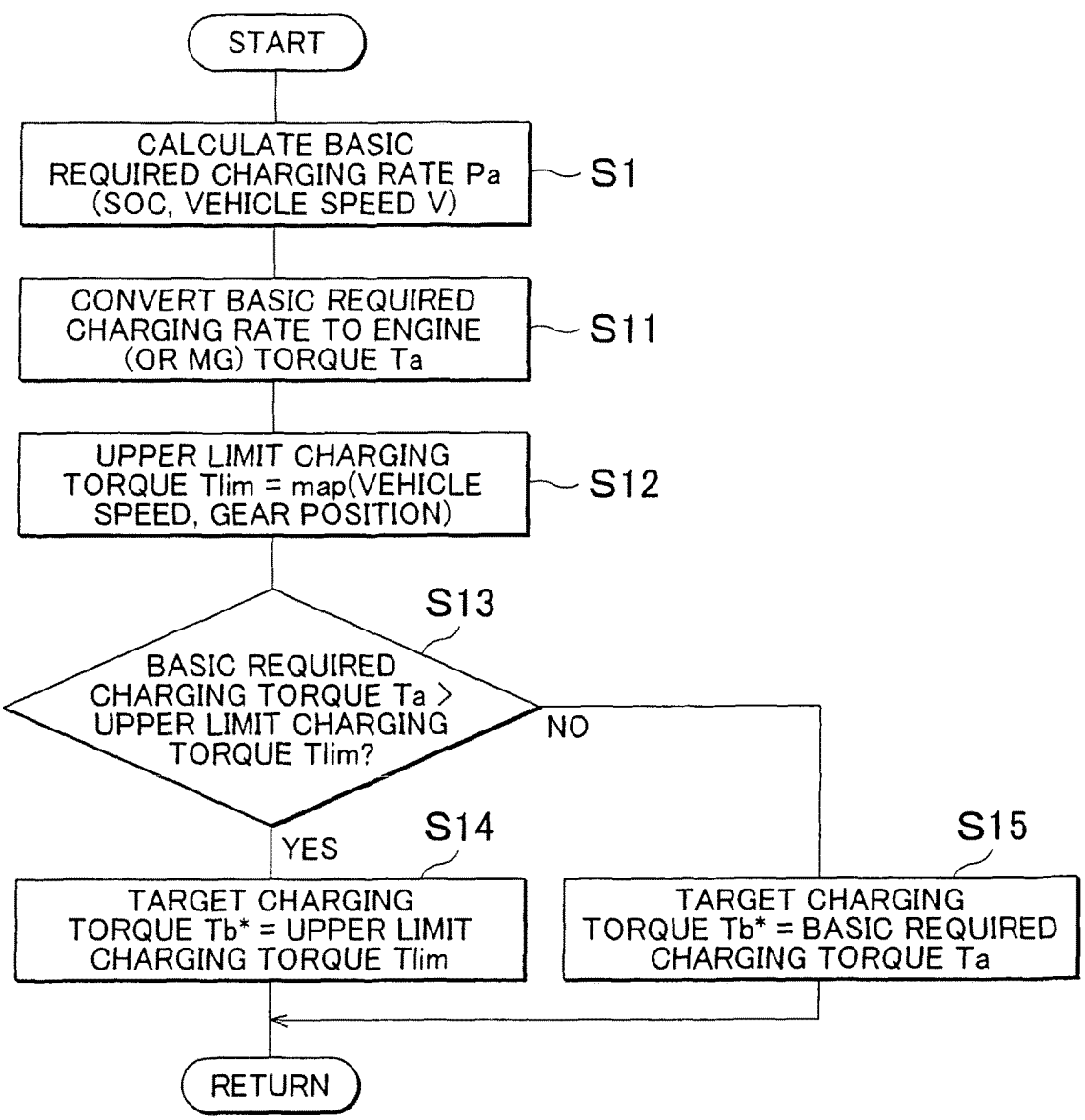
FIG. 9 is a flowchart that illustrates a relevant portion of control operations of the electronic control unit shown in FIG. 7, that is, control operations that are able to suppress vibrations and noise that occur during traveling while keeping the state of charge within an appropriate range.

FIG. 9 is a flowchart that illustrates a relevant portion of control operations of the electronic control unit 150 according to the present embodiment, that is control operations that are able to suppress vibrations and noise that occur during traveling while keeping the state of charge SOC within the appropriate range. For example, the flowchart is repeatedly executed in an extremely short cycle time of about several milliseconds to several tens of milliseconds.

In S1 corresponding to the basic charging torque calculation unit 152, the basic required charging rate Pa is calculated on the basis of the state of charge SOC and the vehicle speed V. Subsequently, in S11 corresponding to the basic charging torque calculation unit 152, the basic required charging torque Ta (=Pa/Ne), obtained by converting the basic required charging rate Pa calculated in S1 to engine torque, is calculated. In S12 corresponding to the upper limit charging torque calculation unit 154, the upper limit charging torque Tlim is calculated on the basis of the vehicle speed V and the speed position (gear position, speed ratio) of the automatic transmission by consulting the prestored map shown in FIG. 8. In S13 corresponding to the target charging torque determination unit 156, it is determined whether the basic required charging torque Ta obtained in S11 is larger than the upper limit charging torque Tlim calculated in S12. When affirmative determination is made in S13, the upper limit charging torque Tlim is set for the target charging torque Tb* in S14 corresponding to the target charging torque determination unit 156. When negative determination is made in S13, the basic required charging torque Ta is set for the target charging torque Tb* in S15 corresponding to the target charging torque determination unit 156.

As described above, according to the present embodiment, the upper limit charging torque Tlim is more limited when the speed position of the automatic transmission 18 is high than when the speed position is low, so the engine 14 is hard to enter a high torque state even when the speed position is high. Thus, it is possible to suppress vibrations and noise that tend to occur at the time when the engine 14 is driven at a low rotation speed and high torque. On the other hand, the upper limit charging torque Tlim is larger when the speed position is low than when the speed position is high, so the charging torque also increases, and it is possible to keep the state of charge SOC of the battery 46 within the appropriate range. In this way, occurrence of vibrations and noise is suppressed by reducing the upper limit charging torque Tlim when the speed position is high, and the appropriate charging torque is set when the speed position is low. Thus, it is possible to achieve both suppressing occurrence of vibrations and noise and keeping the state of charge SOC of the battery 46.

Like the present embodiment, when managed in the dimension of torque, a torque transmission path changes for each speed position of the automatic transmission 18, so the effect of suppressing vibrations and noise during traveling is remarkable by changing the upper limit charging torque Tlim in response to the speed position.

Third Embodiment

In the above-described embodiment, the case where the accelerator operation amount Acc is relatively small in a relatively low vehicle speed region, that is, the case where the required power Pe* of the engine 14 is relatively lower than or equal to the predetermined value, is assumed. Thus, in the above-described embodiment, the required power Pe* is determined with reference to the predetermined value Pc that is a relatively low value, and the upper limit charging rate Plim is uniformly set on the basis of the predetermined value Pc in the region in which the required power Pe* is lower than or equal to the predetermined value Pc. In the present embodiment, setting of the upper limit charging rate Plim in the case where the required power Pe* exceeds the predetermined value Pc and becomes relatively high will be described.

When the required power Pe* increases as a result of depression of the accelerator pedal 76, the required engine torque Te* also increases accordingly. Thus, the required torque Te* (required engine torque) increases in proportion to the required power Pe*, with the result that the engine 14 is driven at a low rotation speed and high torque, so vibrations and noise that occur during traveling also increase. Therefore, the upper limit charging rate calculation unit 108 according to the above-described embodiment is able to calculate the upper limit charging rate Plim on the basis of not only the vehicle speed V and the speed position of the automatic transmission 18 but also the driving power Pe*.

Figure 10:
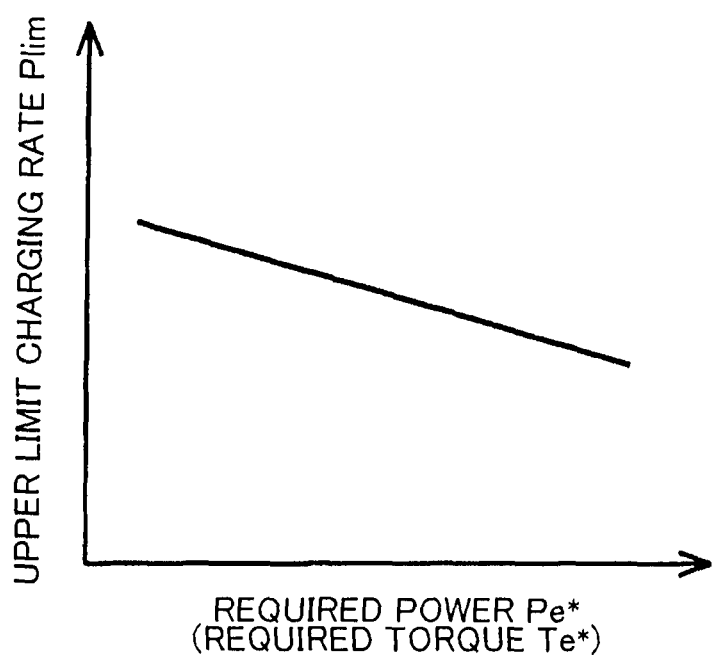
FIG. 10 is a graph that shows the correlation between a required power and an upper limit charging rate.

FIG. 10 is a map that shows the correlation between the required power Pe* and the upper limit charging rate Plim, and is empirically obtained and stored in advance. As shown in FIG. 10, the upper limit charging rate Plim decreases as the required power Pe* increases. This is based on the fact that, when the required power Pe* increases, the required torque Te* also increases accordingly, and vibrations and noise that occur during traveling also increase. That is, the engine torque Te increases as the required torque Te* increases, so the engine 14 tends to enter a high torque state. Therefore, by decreasing the upper limit charging rate Plim as the required power Pe* increases as shown in the map in FIG. 10, occurrence of vibrations and noise during traveling is suppressed by suppressing a high torque state of the engine 14. In the map of FIG. 10, the vehicle speed V and the speed position of the automatic transmission 18 are not shown; however, actually, the upper limit charging rate Plim is set in consideration of these parameters.

The same tendency is obtained when the ordinate axis of FIG. 10 is changed to the upper limit charging torque Tlim. Therefore, the above-described upper limit charging torque calculation unit 154 is able to calculate the upper limit charging torque Tlim on the basis of not only the vehicle speed V and the speed position of the automatic transmission 18 but also the required torque Te*. Thus, the appropriate upper limit charging torque Tlim is set so as to suppress occurrence of vibrations and noise during traveling even when the required torque Te* increases and exceeds a predetermined value.

As described above, according to the present embodiment, when the required power Pe* exceeds the predetermined value, the appropriate charging rate is set even when the required power Pe* increases by changing the upper limit charging rate Plim on the basis of the required power Pe*, so it is possible to suppress occurrence of vibrations and noise during traveling.

The embodiments of the invention are described above with reference to the accompanying drawings; however, the invention is applied in other modes.

For example, the above-described embodiments each are an independent mode; instead, these embodiments may be implemented in combination as needed.

In the above-described embodiments, the automatic transmission 18 is a step-shift transmission. The invention is applicable when a continuously variable transmission, such as a belt-type continuously variable transmission, is used and virtual speed positions are set in the continuously variable transmission and the continuously variable transmission is shifted like a step-shift transmission.

In the above-described embodiment, the abscissa axis of the map shown in FIG. 10 represents required power Pe*. Instead, a similar tendency is obtained when the abscissa axis represents the required torque Te*, and the upper limit charging rate Plim or the upper limit charging torque Tlim may be calculated on the basis of the required torque Te*.

In the above-described embodiments, the upper limit charging rate Plim and the upper limit charging torque Tlim continuously vary against the vehicle speed V; instead, they may vary in a stepwise manner.

The above-described embodiments are only illustrative; the invention may be modified or improved in various forms on the basis of the knowledge of persons skilled in the art.

What is claimed is:

1. A control system for a hybrid vehicle, the control system comprising:
    a drive wheel;
    an engine coupled to the drive wheel such that power is transmitted to the drive wheel;
    an electric motor coupled to the drive wheel such that power is transmitted to the drive wheel;
    a transmission provided in a power transmission path between the drive wheel and both the engine and the electric motor;
    a battery configured to be charged with electric power generated by the electric motor; and
    a controller configured to cause the hybrid vehicle to travel by using power of the engine while keeping a charging rate for charging the battery at or below a limit charging value in response to a charging request for charging the battery, the controller being configured to set the limit charging value such that the limit charging value is lower when a speed position of the transmission is high than when the speed position is low.

2. The control system according to claim 1, wherein
    the controller is configured to set the limit charging value such that the limit charging value is lower when a vehicle speed is low than when the vehicle speed is high.

3. The control system according to claim 1, wherein
    the controller is configured to calculate a basic required charging rate for keeping a state of charge of the battery within a predetermined range on the basis of the state of charge of the battery, and set a lower one of the basic required charging rate and the limit charging value as a target charging value.

4. The control system according to claim 3, wherein
    the controller is configured to set the basic required charging rate such that the basic required charging rate increases as the state of charge of the battery decreases.

5. The control system according to claim 3, wherein
the controller is configured to decrease the basic required charging rate when a vehicle speed is higher than or equal to a predetermined vehicle speed as compared to when the vehicle speed is lower than the predetermined vehicle speed.

6. The control system according to claim 1, wherein
the electric motor is configured to generate electric power by using the power of the engine.

7. The control system according to claim 6, further comprising:
a clutch provided between the engine and the electric motor, wherein
the controller is configured to engage the clutch at a time when the battery is charged with electric power generated by the electric motor by using the power of the engine.

8. The control system according to claim 1, wherein
the transmission is a step-shift automatic transmission.

9. The control system according to claim 1, wherein
the transmission is a continuously variable transmission.

* * * * *